Figure 5:
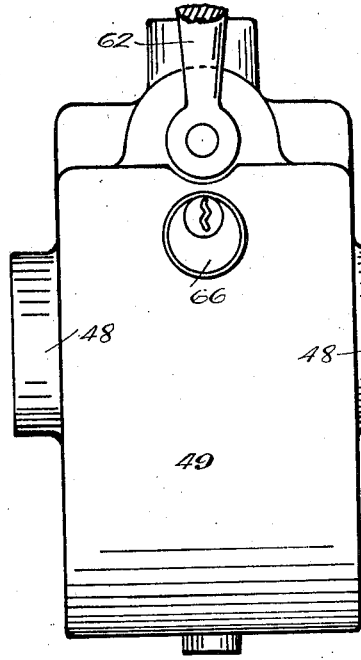

June 24, 1924.
1,499,131
C. W. UNKLE
BEATER ROLL ADJUSTER
Original Filed Oct. 18, 1922   3 Sheets-Sheet 1
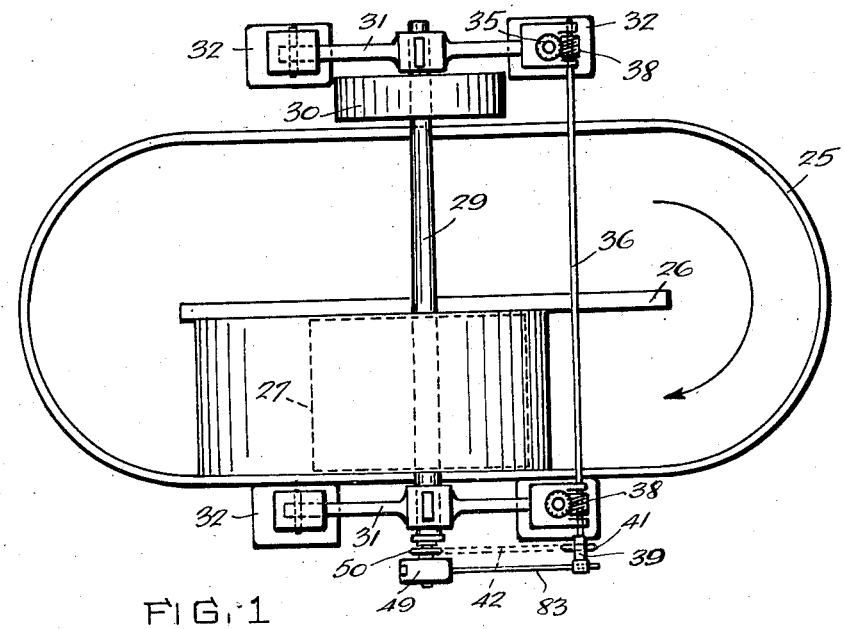
FIG. 1
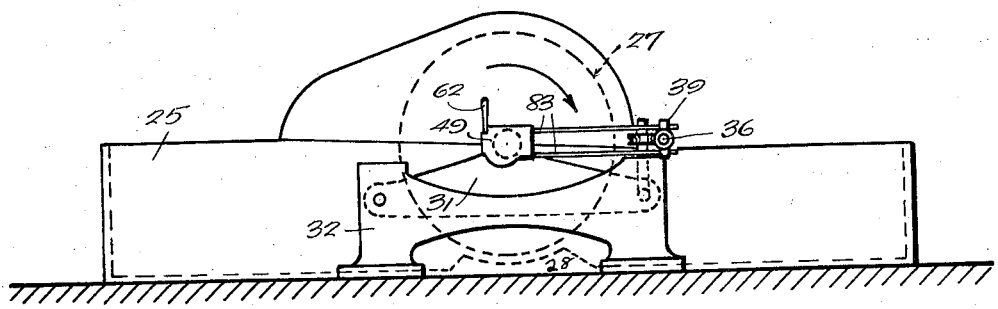
FIG. 2
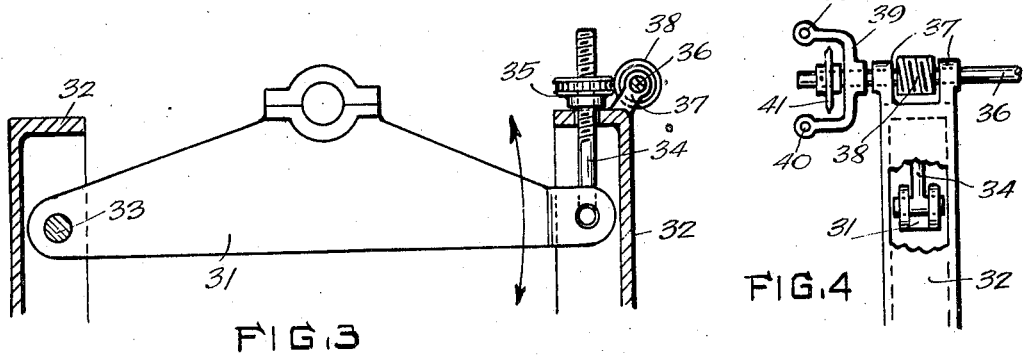
FIG. 3
FIG. 4
INVENTOR
CHARLES W. UNKLE
By Shigley & Harney
ATTORNEYS June 24, 1924.

C. W. UNKLE

BEATER ROLL ADJUSTER

Original Filed Oct. 18, 1922   3 Sheets-Sheet 2

1,499,131

INVENTOR
CHARLES W. UNKLE
By Shigley & Harney
ATTORNEYS

June 24, 1924.
C. W. UNKLE
1,499,131
BEATER ROLL ADJUSTER
Original Filed Oct. 18, 1922  3 Sheets-Sheet 3
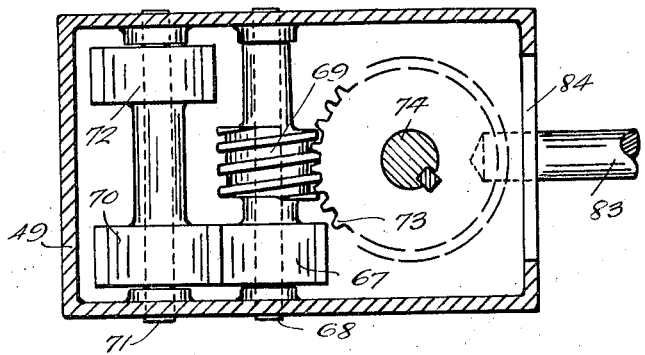
FIG. 10
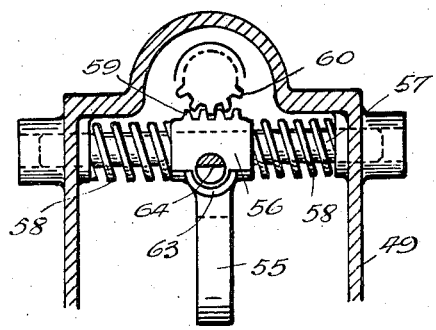
FIG. 11
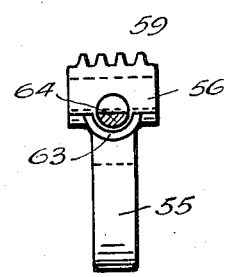
FIG. 12
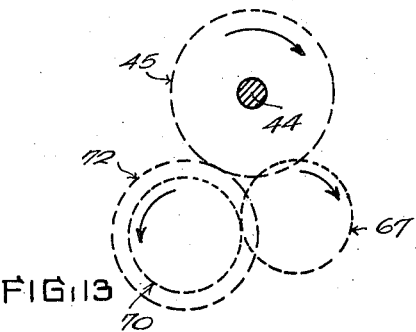
FIG. 13
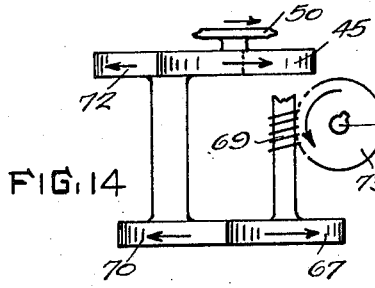
FIG. 14
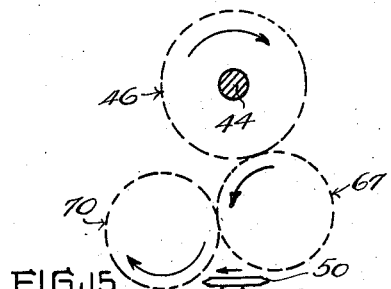
FIG. 15
FIG. 16
INVENTOR
CHARLES W. UNKLE
BY Shigley & Harney
ATTORNEYS Patented June 24, 1924.

1,499,131

UNITED STATES PATENT OFFICE.

CHARLES W. UNKLE, OF BALTIMORE, OHIO, ASSIGNOR TO THE GRILEY-UNKLE ENGINEERING COMPANY, OF LANCASTER, OHIO.

BEATER-ROLL ADJUSTER.

Application filed October 18, 1922, Serial No. 595,339. Renewed May 9, 1924.

*To all whom it may concern:*

Be it known that I, CHARLES W. UNKLE, a citizen of the United States of America, residing at Baltimore, in county of Fairfield and State of Ohio, have invented certain new and useful Improvements in Beater-Roll Adjusters, of which the following is a specification.

My present invention relates generally to machines for the reduction of paper to pulp, and more particularly to what are commonly known in the paper making industry as tub beaters, consisting as they do of an elongated tub with rounded ends, in which the paper to be pulped, together with the necessary water or other liquid or liquids with which the paper is to be processed, are placed.

It is well known in the paper making industry that in addition to this tub, beaters of this type have centrally and longitudinally of the tub what is known as a "midfeather" permitting of a circulation of material around its ends and within the tub, which circulation is induced by the action of the beater roll operating approximately at the center of the tub upon one side of the mid-feather and generally constructed of wood and embodying knives or fly bars with which it is thus equipped to cooperate with the usual bed plate having an upper concave surface and mounted in the bottom of the tub below the beater roll.

It is also well known that the beater roll in these constructions is mounted on a shaft extending transversely across the tub and provided outside of the latter with a belt receiving pulley, the shaft being adapted to be shifted vertically in order to adjust the beater roll toward and away from the bed plate. For this purpose the ends of the shaft are journaled intermediate the ends of side lighter bars, these lighter bars being pivotally supported at one end and having their opposite ends free for vertical adjustment whereby similar adjustment is communicated to the shaft and the beater roll.

At the present time the practice is to raise and lower the vertically movable ends of the lighter bars by hand, and it has been found to be not only a waste of time and labor but, depending as it does upon more or less guess work, the results are extremely doubtful and in some instances disastrous.

For the above reasons my invention aims in the first instance to provide a mechanical means for adjusting the lighter bars, and through the same, the beater roll, is capable of being easily and quickly regulated so as to govern the extreme limits of movement of the beater roll toward and away from the bed plate, and a further object is the provision of a beater roll adjusting mechanism which will automatically throw out of action as the end of each upward or downward adjusting movement of the roll is reached.

A still further object of the invention is the provision of a mechanism of this character by means of which the power for raising and lowering the beater roll may be taken from the beater roll shaft and in this way avoid the necessity for extra power connections, that is beyond those ordinarily required and a still further object is the provision of a mechanism which may be readily installed in connection with tub beaters now in use, which will be small, compact, strong and durable, and one which will effectively and efficiently perform the desired functions.

Figure 6:
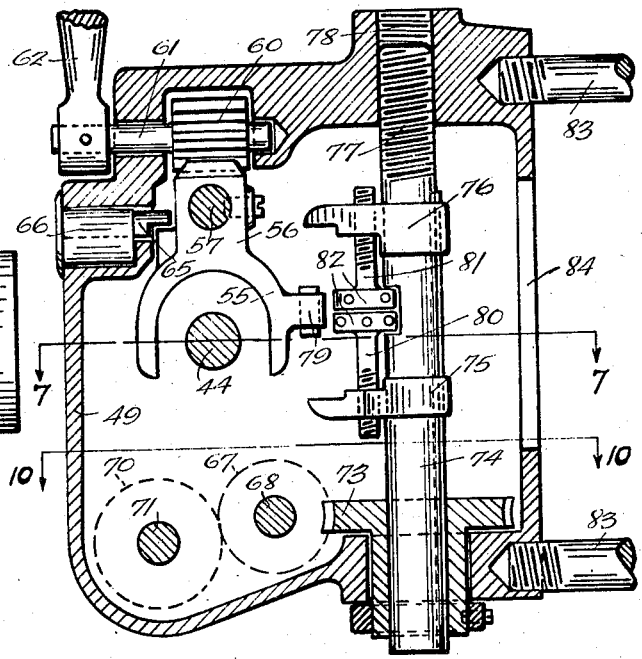
Figure 8:
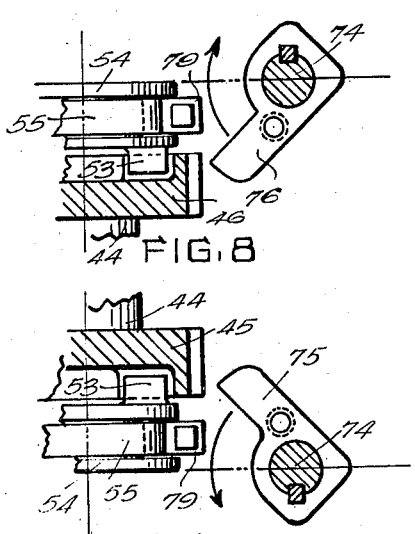
Figure 9:
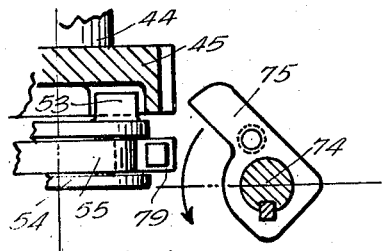
Figure 7:
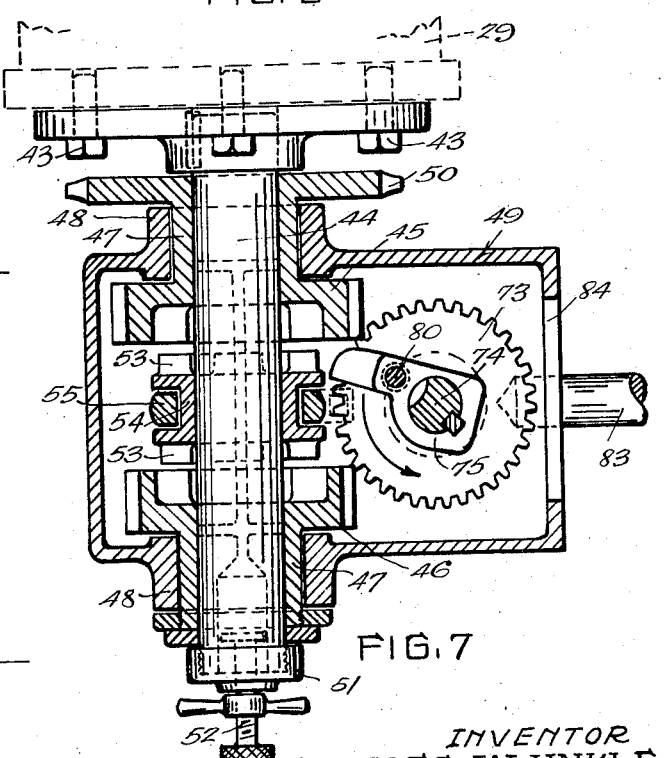

The accompanying drawings, which form a part of this specification, illustrate the preferred structural form of the invention, and embody several figures of which Figure 1 is a top plan view of a tub beater showing the same equipped with my improvements, Figure 2 is a side elevation thereof, Figure 3 is an enlarged side view of one of the lighter bars, showing the supports thereof in section, Figure 4 is a side view of one end of the worm shaft and the supports adjacent thereto, Figure 5 is a side view of the gear case, Figure 6 is a central vertical transverse section through the gear case, Figure 7 is a horizontal section through the gear case taken substantially on line 7—7 of Figure 6, Figures 8 and 9 are detail horizontal sections of portions of the gearing illustrating the clutch in its two active positions, Figure 10 is a horizontal section through the gear case taken on line 10—10 of Figure 6, Figure 11 is a fragmentary longitudinal section taken through the upper portion of the gear case, showing the clutch shifting yoke in inactive position with the lock released, Figure 12 is a detail side view of the clutch shifting yoke showing the same locked, Figures 13 and 14 are diagrams respectively in side and top plan view of the train of active gears when the clutch is shifted in one direction, and Figures 15 and 16 are diagrams respectively in side and top plan showing the active gear train when the clutch is shifted in the opposite direction.

Referring now to these figures, and particularly to Figures 1 and 2, I have shown a pulp beater of that type including a tub 25 within which a mid-feather 26 provides for the circulation of pulp around the ends thereof under the effect of rotation of the beater roll 27 which may be of any suitable construction and which, in addition to its rotation and its action upon the pulp through the knives or flybars with which it is provided, is vertically adjustable toward and away from the upper concave surface of the bed plate seen at 28 in Figure 2, with which the roll cooperates in the grinding of the pulp.

The bed plate 28 is of course mounted within the tub 25 upon the same side of the mid-feather 26 as the roll 27 and below the latter, and in action when filling the tub with old paper or other material to be pulped, the beater roll is elevated and spaced substantially above the bed plate, to save power and wear of the parts while the material is as yet raw or unbeaten, the distance of spacing depending to some extent at least, upon the particular material as well as upon the speed with which the tub is being filled.

During the pulping operation the beater roll is gradually lowered toward the bed plate until it reaches the minimum spacing at which it ceases to move downwardly, although it continues to rotate during and after its downward movement until the pulping is completed.

For the above purposes the beater roll shaft 29, upon which the beater roll is fixed, extends across and above the tub 25 and in addition to the belt pulley 30 thereof, its ends are journaled through lighter bars 31 intermediate the ends of the latter as best seen in Figure 3. These lighter bars, one at each side of the tub 25 are supported in side frames 32 in portions of which the bars are pivoted at one end as at 33, the opposite ends thereof being free for vertical movement in other portions of the frames. These free ends of the lighter bars may, for instance, be pivotally connected to the lower ends of screw rods 34 extending upwardly therefrom, through adjusting nuts 35 which, as seen in Figure 4, rotate in horizontal planes upon the upper portions of the frames and may be in the form of worm wheels.

Across the tub 25 is extended a worm shaft 36 for the support of which the frames 32 have bearing brackets 37, and fixed upon this shaft are worms 38 engaging the worm wheel adjusting nuts 35 so that upon rotation of the worm shaft the lighter bars 31 will be simultaneously raised or lowered depending upon the direction of such rotation and the beater roll 27 and its shaft 29 will be similarly raised or lowered.

According to the present invention, the worm shaft 36 has at one end a journal bracket 39 provided with upper and lower outstanding arms 40, and also has a sprocket wheel 41 whereby, as will be hereinafter made plain, it may be driven through a sprocket chain 42 from the beater roll shaft 29.

For these purposes, one flanged end of the beater roll shaft 29 as seen in dotted lines in Figure 7 provides for connection, by bolts and the like 43, of an axially projecting extension shaft 44 which extension shaft has upon its inner and outer portions sleeve gears 45 and 46 best seen in Figure 7, the sleeves 47 of which gears rotate on the shaft and within the opposite journals 48 of a gear case 49 through which said extension shaft is mounted. With the sleeve 47 of the inner gear 45, a sprocket wheel 50 is rigid and thus disposed inwardly beyond the gear case 49 so as to freely receive the sprocket chain 42. The sleeve 47 of the outer gear may receive a screw cap 51 outside the gear case and this cap may support a lubricator 52 from which grease and the like may be forced into channels of the extension shaft as seen in dotted lines in Figure 7 and thus to the gears 45 and 46.

The gears 45 and 46 have external teeth and their opposing faces are internally notched to cooperate with the opposite clutch faces 53 of a clutch sleeve 54 splined on the shaft 44 between, and movable into engagement with either of, the said gears, said sleeve having an annular groove in which a yoke 55 is seated. This yoke is integral at its upper portion with a sleeve 56 slidable on a cross rod 57 in the upper portion of the gear case above and paralleling shaft 44 and held between springs 58 on said rod whereby the clutch sleeve will be normally held in centered or neutral position free of both gear clutches.

The upper portion of the yoke sleeve 56 has rack teeth 59 engaged by a gear 60 at the inner end of a control shaft 61 journaled in the upper portion of the gear case 49 at right angles to and above the cross rod 57 and having upon its outer end an upstanding handle 62. It will also be noted that yoke sleeve 56 has a shoulder 63 at one side presenting a concave upper face with which the reduced inner end 64 of the stem 65 of a lock 66 mounted in the adjacent wall of the gear case may cooperate in one position as seen in Figure 12 so as to prevent movement of the yoke and thus avoid manipulation of the parts except by those delegated to do so.

When the clutch member 54 is shifted into engagement with gear 46, rotation of the extension shaft 44 is thus communicated to said gear 46 and from the latter to a gear 67 on a lower shaft 68, with which gear 67 the clutch gear 46 is constantly in mesh. Gear 67 of shaft 68 is fast with a worm 69 and is in mesh with gear 70 at one end of a shaft 71 paralleling the shaft 68 and having at its opposite end a gear 72 constantly in mesh with the clutch gear 45 so that the latter will thus be driven in a direction opposite to that it would be driven if the clutch member 54 were directly engaged therewith. This gearing, all enclosed within the gear case 49 is plainly to be seen by a comparison of Figures 7 and 10 together with the diagrams Figures 13 and 15.

The worm 69 just above mentioned, which is obviously driven in one direction when gear 45 is clutched and in the opposite direction when gear 46 is clutched, is in constant mesh with the lower worm wheel 73 of an upright shaft 74 journaled in the gear case and upon which said worm wheel and a pair of vertically spaced clutch throw off arms 75 and 76 are splined. The upper end of this shaft is threaded as at 77 and works in a threaded bore 78 in the top of the gear case so that when the shaft is rotated it moves up or down, depending upon the direction of such rotation, and one of the throw off arms 75 and 76 will finally come into action against a lug or projection 79 extending from the clutch sleeve 54.

The throw off arms 75 and 76 are adjustable by means of screw stems 80 and 81 whose heads 82 abut one another within a recess 83 of the shaft 74 and it is thus obvious either one or both of the throw off arms may be adjusted up or down so as to thereby regulate the upper and lower limits of vertical adjustment of the beater roll and the extent of adjusting movement thereof between such limits.

Thus when the operator swings handle 62 to the left in Figure 5, the clutch shifting yoke 55 is moved to the right and clutch sleeve 54 will be engaged with gear 46 with the result that through the chain of gears seen in Figures 15 and 16 shaft 74 will be rotated in a direction opposite the arrow in Figure 7. Thus shaft 74 will lower until finally throw out arm 76 will strike the projection 79 and throw the clutch sleeve 54 out of engagement with the gear 46 as indicated in Figure 8. The reverse of this action takes place when the clutch member is engaged with the gear 45, the vertical shaft 74 moving upwardly and the lower throw off arm 75 finally coming into action against the clutch sleeve as in Figure 9. It is thus to be seen that after once starting the operation, no further attention is required of the operator and that when the beater roll reaches the set limit of its adjusting movement either up or down, it will be automatically stopped and the adjusting mechanism thrown out of action until again started for the adjusting movement of the roll in the opposite direction.

For the non-shifting support of the gear case 49 as a whole, a pair of rods 83 extend from one side thereof in parallel relation to, and connect with, the arms 40 of the worm shaft bracket 39 before described.

It will thus be observed that I not only mechanically control and limit adjusting movement of the beater roll and its rotating shaft during rotation thereof, but I employ for this purpose the power rotations of the shaft and, by the same power provide for the automatic stopping of adjusting movement of the shaft when it reaches the set limit of adjusting movement in either direction.

It will also be observed that I provide for ready adjustment of the limits of movement of the beater roll shaft as the adjusting screws 80 and 81 are easily accessible through an opening 84 in one side of the gear case as shown particularly in Figure 6.

I claim:

1. The combination with a beater roll and its shaft rotatable and vertically shiftable, of mechanical means for controlling and limiting vertical shifting movements thereof, said means being adjustable to vary the limits of such shifting movements.

2. The combination with a rotatable and vertically shiftable beater roll and its shaft having power actuated means for rotating the same, of mechanical means for vertically shifting the same having means to throw the said shifting means out of action at the limits of shifting movement.

3. The combination with a rotatable and vertically shiftable beater roll and its shaft having power actuated means for rotating the same, of mechanical means for vertically shifting the same having means to throw the said shifting means out of action at the limits of shifting movement, said last named means being manually adjustable to vary the limits of shifting movement.

4. A rotatable beater roll and its shaft having means actuated by the same in its rotation for shifting the beater roll and shaft vertically and automatically checking the same at the limits of shifting movement.

5. A rotatable beater roll and its shaft having means actuated by the same in its rotation for shifting the beater roll and shaft vertically and automatically checking the same at the limits of shifting movement, said checking means being adjustable to vary the limits of shifting movement.

6. A rotatable and vertically adjustable beater roll and its shaft having mechanical means for adjusting the same including a manually engageable two-way clutch, and means for automatically disengaging said clutch at the limits of adjustment of the beater roll and its shaft.

7. A rotatable and vertically adjustable beater roll and its shaft having mechanical means for adjusting the same including a manually engageable two-way clutch, and means for automatically disengaging said clutch at the limits of adjustment of the beater roll and its shaft, said last named means being manually adjustable to vary the limits of adjusting movement of the beater roll and shaft.

8. A beater roll and its shaft having rotatable and up and down adjusting movements, mechanism for adjusting the same having actuating connections with the shaft including a manually engageable clutch, and manually adjustable means actuated by said mechanism for automatically disengaging said clutch at the limits of said up and down adjusting movements.

9. A rotatable beater roll and its shaft, vertically adjustable supports in which said shaft is journaled, an adjusting shaft similarly geared to said supports, a gear case mounted in connection with the roll shaft, and gearing within said casing including a gear flexibly connected to said adjusting shaft and also including a manually engageable direction-controlling clutch forming a connection between said gearing and the roll shaft.

10. A rotatable beater roll and its shaft, vertically adjustable supports in which said shaft is journaled, an adjusting shaft similarly geared to said supports, a gear case mounted in connection with the roll shaft, gearing within said casing including a gear flexibly connected to said adjusting shaft and also including a manually engageable two-way clutch for operatively connecting the gearing with the roll shaft, and a member movable within the gear case and actuated by said gearing, having clutch throw-out-elements movable therewith to release the clutch at the limits of adjustable movement of said supports.

11. A rotatable beater roll and its shaft, vertically adjustable supports in which said shaft is journaled, an adjusting shaft similarly geared to said supports, a gear case mounted in connection with the roll shaft, gearing within said casing including a gear flexibly connected to said adjusting shaft and also including a manually engageable two-way clutch for operatively connecting the gearing with the roll shaft, and a member movable within the gear case and actuated by said gearing, having clutch throw-out-elements movable therewith to release the clutch at the limits of adjustable movement of said supports, said throw-out elements being manually and independently adjustable on said member for the purpose described.

12. A rotatable and vertically adjustable beater roll having mechanism actuated by rotation thereof for vertically shifting the same, said mechanism including manually controlled starting means and having automatic manually adjustable stopping means, as described.

In testimony whereof I have affixed my signature.

CHARLES W. UNKLE.